J. BYRNE.
NEGATIVE PLATES FOR GALVANIC BATTERIES.

No. 182,101. Patented Sept. 12, 1876.

Witnesses:
A. S. Fitch
Henry Eichling

Inventor.
John Byrne
By J. P. Fitch
his Atty.

UNITED STATES PATENT OFFICE.

JOHN BYRNE, OF BROOKLYN, NEW YORK.

IMPROVEMENT IN NEGATIVE PLATES FOR GALVANIC BATTERIES.

Specification forming part of Letters Patent No. 182,101, dated September 12, 1876; application filed October 19, 1875.

*To all whom it may concern:*

Be it known that I, JOHN BYRNE, of the city of Brooklyn, county of Kings, and State of New York, have invented certain new and useful Improvements in Negative Plates or Elements for Galvanic Batteries, of which the following is a specification, reference being had to the accompanying drawings, forming part thereof, in which—

Figure 1:
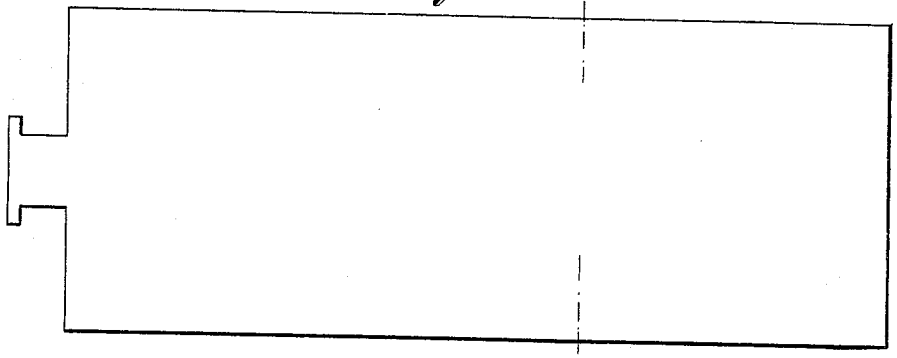
Figure 2:
Figure 3:
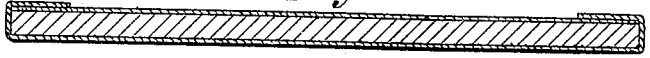
Figure 4:
Figure 5:

Figure 1 is a side-surface view of a negative plate for a battery; Fig. 2, a cross-section of the same, showing the body or core of the plate with its envelope or covering. Figs. 3, 4, and 5 are similar views, showing several modifications of the manner in which the edges of the envelope or covering are united together at the edge or edges of the plate, so as to form tight joints, and be impervious to fluid.

It is well known that in the organization of a galvanic cell it is desirable that the negative element shall be some material which, while it has in a high degree power to conduct electricity, is not susceptible to attack from the acid employed in the cell. It is also well known that the less the internal resistance in any galvanic cell the greater will be the power obtainable. Hence, though carbon and platinum are the principal negative elements employed, because of their extreme negative qualities and indestructibility, nevertheless, the very great resistance offered by both of these substances (more particularly carbon) renders the actual amount of power obtainable very small.

The object of my invention is, by forming a negative element with a flat, cylindrical, or other shaped core of copper or other good conducting material, so covered by platinum that the core is completely protected from the acid, to obtain in the same element the advantage of the high conductibility of the one metal, and the negative and indestructible qualities of the other, thus securing, as I do, greater battery-power. To this end, I take copper, silver, brass, or other good conductors of suitable dimensions and form for the battery in which I desire to use it, and completely envelope it with sheet-platinum. I do not coat the copper with the platinum by electro or other deposit from solution of the latter metal, but I apply it in the compact form of a rolled or beaten sheet.

A convenient method is to immerse the core, after thorough cleansing, in molten solder. Then lay the platinum foil or plate (previously turned on one side) upon the prepared conducting-core, and pass over the surface of the platinum an iron hot enough to melt the solder between the core and envelope. If the negative electrode be a hollow cylinder, or solid round body, the ends may be protected by plugs of hard rubber, or in any other manner, so as to protect the uncovered parts of the core from the action of the acid solution. In flat plates the edges and ends of the core must be protected, as well as the side faces.

Figs. 3, 4, and 5 represent several convenient methods of applying the platinum so as to accomplish this end. Fig. 3 represents the platinum just covering one face of the copper plate, while the platinum laid upon the other side extends beyond the edges all around, and the extended portion is folded around the edges, over and upon the platinum on the opposite face of the plate. Or the platinum on both faces of the copper plate may extend all around beyond the latter, and, together, be folded over, as represented by Fig. 4; or the platinum may be a single piece, wrapped around the copper, and folded only on one edge and at the ends, as represented in Fig. 5; or, the sheet of platinum on either side or face of the core being allowed to project so as to leave an open gutter, the said gutter may be filled up by clean lead, and fused by hot iron; or the edges of the core may be covered by a leaden binding, soldered thereto previous to the application of the platinum.

I am aware that negative elements coated with platinum by depositing the same from a solution have been used in galvanic batteries. My plates herein described differ essentially from those coated by such deposit in the condition and character of the platinum constituting the covering. Deposited metal is, in some degree, porous, and therefore not a perfect protection to the metal underneath against the acid, as it is found by experience that the acid will make its way through the comparatively spongy deposited platinum.

I have found by practice that when the copper or other metal is coated with a rolled or beaten sheet or foil of platinum, as herein described, with the result of perfectly protecting the former, there is a great increase of battery-power over any other form of negative plate with which I am acquainted, owing to its superior conducting qualities. Such plate, therefore, supposing the core to consist of copper, besides being substantially indestructible, and having the full conducting-power of copper alone, develops in the battery a largely-increased percentage of efficiency over either copper or platinum alone.

I have spoken above of the negative element of a battery as in the form of a "plate" and "core;" but of course the form of the element is immaterial. It may be a plate, or other suitable form to be immersed in the fluid; or the cell itself may be the negative element, made of some good conducting metal, lined with plate-platinum; the essential thing being to employ a good conducting metal, and completely protect this from the acid by coating with plate-platinum.

What I claim as my invention, and desire to secure by Letters Patent, is—

1. The negative element of a galvanic battery, consisting of a conducting-core covered with a solid adherent coating of platinum, whereby the direct action of the acid upon the said core is entirely prevented, substantially as described.

2. The improved process or method of fabricating negative plates for galvanic batteries described, consisting of coating a copper core with solder, applying thereto a plate of rolled or hammered platinum, having its surface previously tinned, and then applying heat, so as to metallically unite the copper and platinum, the platinum being made to completely envelop the copper, as and for the purpose specified.

JOHN BYRNE.

Witnesses:
A. S. FITCH,
HENRY EICHLING.